US010757657B2

(12) United States Patent
Nam et al.

(10) Patent No.: US 10,757,657 B2
(45) Date of Patent: *Aug. 25, 2020

(54) APPARATUS AND METHOD FOR TRANSMISSION OF UPLINK SOUNDING REFERENCE SIGNALS IN A WIRELESS NETWORK

(71) Applicant: Samsung Electronics Co., Ltd., Suwon-si, Gyeonggi-do (KR)

(72) Inventors: Young-Han Nam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

This patent is subject to a terminal disclaimer.

(21) Appl. No.: 15/651,815

(22) Filed: Jul. 17, 2017

(65) Prior Publication Data

US 2017/0318543 A1 Nov. 2, 2017

Related U.S. Application Data

(63) Continuation of application No. 14/846,472, filed on Sep. 4, 2015, now Pat. No. 9,788,278, which is a (Continued)

(51) Int. Cl.
*H04W 52/14* (2009.01)
*H04L 25/02* (2006.01)
(Continued)

(52) U.S. Cl.
CPC ........... *H04W 52/146* (2013.01); *H04L 5/001* (2013.01); *H04L 5/0005* (2013.01); (Continued)

(58) Field of Classification Search
CPC ..... H04W 72/04; H04W 88/08; H04W 76/00; H04W 4/06; H04W 72/0446;
(Continued)

(56) References Cited

U.S. PATENT DOCUMENTS

2008/0207150 A1\* 8/2008 Malladi ................. H04L 5/0048
455/127.1
2009/0042615 A1\* 2/2009 Teo ...................... H04B 7/0691
455/562.1
(Continued)

FOREIGN PATENT DOCUMENTS

CN 101617482 A 12/2009
CN 101640904 A 2/2010
(Continued)

OTHER PUBLICATIONS

International Search Report dated Mar. 26, 2012 in connection with International Patent Applicaiton No. PCT/KR2011/005973.
(Continued)

*Primary Examiner* — Hardikkumar D Patel

(57) ABSTRACT

A mobile station for use in a wireless network that operates according to the Long-Term Evolution Advanced (LTE-A) standard is configured to transmit an aperiodic sounding reference signal (SRS) to a base station in response to a triggering grant received from the base station. The bandwidth on which the mobile station transmits the aperiodic SRS depends on a type of the triggering grant. The type of the triggering grant is one of a downlink grant, an uplink multiple-input, multiple-output (MIMO) grant, and an uplink single-input, multiple-output (SIMO) grant.

16 Claims, 6 Drawing Sheets

Related U.S. Application Data continuation of application No. 13/205,430, filed on Aug. 8, 2011, now Pat. No. 9,131,457.

(60) Provisional application No. 61/373,245, filed on Aug. 12, 2010, provisional application No. 61/408,445, filed on Oct. 29, 2010, provisional application No. 61/479,282, filed on Apr. 26, 2011.

(51) Int. Cl.
| | |
|---|---|
| *H04W 52/32* | (2009.01) |
| *H04W 72/00* | (2009.01) |
| *H04L 5/00* | (2006.01) |
| *H04W 52/42* | (2009.01) |
| *H04W 52/36* | (2009.01) |
| *H04W 72/04* | (2009.01) |
| *H04W 52/28* | (2009.01) |
| *H04W 52/34* | (2009.01) |

(52) U.S. Cl.
CPC ........ *H04L 5/0048* (2013.01); *H04L 25/0226* (2013.01); *H04W 52/325* (2013.01); *H04W 52/367* (2013.01); *H04W 52/42* (2013.01); *H04W 72/00* (2013.01); *H04W 72/0413* (2013.01); *H04W 52/281* (2013.01); *H04W 52/34* (2013.01); *H04W 52/346* (2013.01)

(58) Field of Classification Search
CPC . H04W 72/0453; H04W 80/04; H04W 84/12; H04W 88/06; H04W 84/18
See application file for complete search history.

(56) References Cited

U.S. PATENT DOCUMENTS

| | | | | |
|---|---|---|---|---|
| 2009/0088148 A1* | 4/2009 | Chung | .................. | H04W 48/16 455/423 |
| 2009/0181687 A1* | 7/2009 | Tiirola | .................. | H04L 5/0048 455/450 |
| 2010/0322185 A1* | 12/2010 | Park | .................... | H04W 72/085 370/331 |
| 2011/0199944 A1* | 8/2011 | Chen | .................... | H04L 5/0057 370/280 |
| 2011/0275335 A1* | 11/2011 | Luo | .................... | H04W 52/281 455/127.1 |
| 2011/0280169 A1* | 11/2011 | Seo | .................... | H04W 52/367 370/311 |
| 2012/0294254 A1* | 11/2012 | Behravan | .............. | H04L 5/0048 370/329 |
| 2013/0083661 A1 | 4/2013 | Gupta et al. | | |
| 2014/0038660 A1 | 2/2014 | Malladi et al. | | |
| 2014/0056192 A1 | 2/2014 | Meylan et al. | | |
| 2014/0113629 A1 | 4/2014 | Jin et al. | | |
| 2014/0204933 A1 | 7/2014 | Roy et al. | | |

FOREIGN PATENT DOCUMENTS

| | | |
|---|---|---|
| KR | 2010-0048572 A | 5/2010 |
| KR | 2010-0088952 A | 8/2010 |
| WO | WO 2010087622 A2 | 8/2010 |
| WO | WO 2012097759 A2 | 7/2012 |

OTHER PUBLICATIONS

Chinese Office Action dated Jun. 23, 2015 in connection with Chinese Patent Application No. 201180039257.1; 15 pgs.

Japanese Office Action dated May 1, 2015 in connection with Japanese Patent Application No. 2013-524054; 6 pgs.

3GPP TSG RAN WG1 #59bis; "Further Details on LTE-A UL Power Control"; R1-100449; Texas Instruments; Valencia, Spain, Jan. 18-22, 2010; 5 pgs.

3GPP TSG RAN WG1 Meeting #58bis; "Uplink Power Control for Carrier Aggregation"; R1-094274; Ericsson; Miyazaki, Japan; Oct. 12-16, 2009; 4 pgs.

Motorola, "Aperiodic SRS for LTE-A", 3GPP TSG RAN1 #60bis, Apr. 12-16, 2010, 3 pages.

LG Electronics, "Uplink power control in LTE-Advanced", 3GPP TSG RAN WG1 #59, Nov. 9-13, 2009, R1-094470, 5 pages.

Office Action dated Oct. 8, 2019 in connection with Chinese Patent Application No. 201710606749.4, 17 pages.

\* cited by examiner

| | 1 | 2 | 3 | 4 | 5 | 6 | 7 | 8 |
|---|---|---|---|---|---|---|---|---|
| Octet 1 | R | \multicolumn{7}{c|}{Timing Advance Command} |
| Octet 2 | \multicolumn{4}{c|}{Timing Advance Cmd} | \multicolumn{4}{c|}{UL Grant} |
| Octet 3 | \multicolumn{8}{c|}{UL Grant} |
| Octet 4 | \multicolumn{8}{c|}{UL Grant} |
| Octet 5 | \multicolumn{8}{c|}{Temporary C-RNT1} |
| Octet 6 | \multicolumn{8}{c|}{Temporary C-RNT1} |

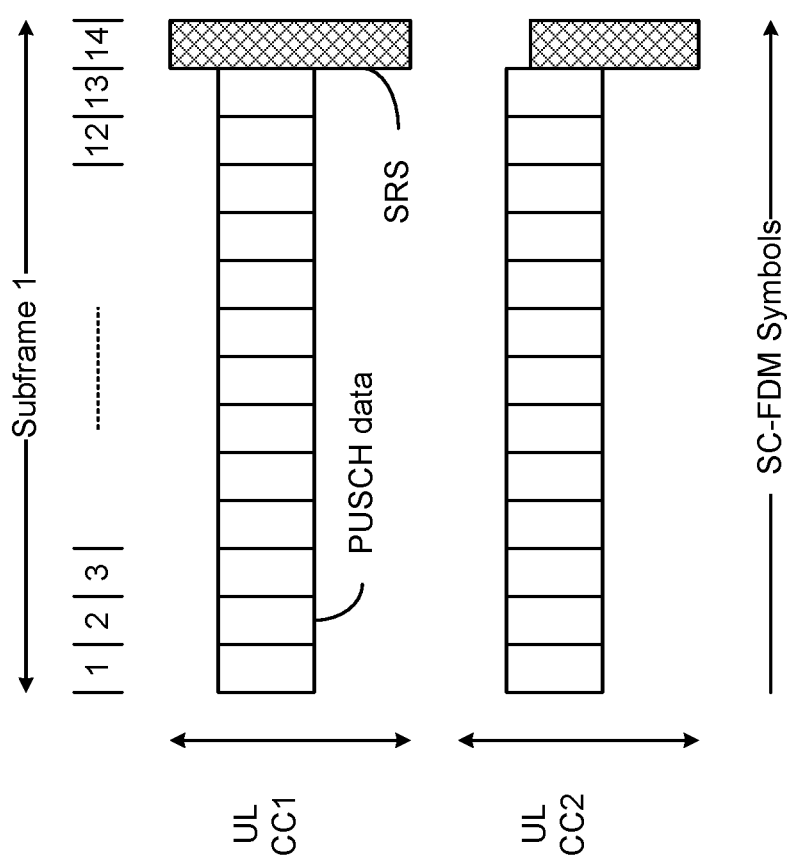

APPARATUS AND METHOD FOR TRANSMISSION OF UPLINK SOUNDING REFERENCE SIGNALS IN A WIRELESS NETWORK

CROSS-REFERENCE TO RELATED APPLICATION(S) AND CLAIM OF PRIORITY

This application is a continuation of U.S. Non-Provisional patent application Ser. No. 14/846,472 filed Sep. 4, 2015 and entitled "APPARATUS AND METHOD FOR TRANSMISSION OF UPLINK SOUNDING REFERENCE SIGNALS IN A WIRELESS NETWORK," which is a continuation of U.S. Non-Provisional patent application Ser. No. 13/205,430 filed Aug. 8, 2011 and entitled "APPARATUS AND METHOD FOR TRANSMISSION OF UPLINK SOUNDING REFERENCE SIGNALS IN A WIRELESS NETWORK," now U.S. Pat. No. 9,131,457, and claims priority to U.S. Provisional Patent Application No. 61/373,245 filed Aug. 12, 2010 and entitled "UPLINK SOUNDING REFERENCE SIGNALS IN CARRIER AGGREGATED SYSTEMS," U.S. Provisional Patent Application No. 61/408,445 filed Oct. 29, 2010 and entitled "UPLINK SOUNDING REFERENCE SIGNALS IN CARRIER AGGREGATED SYSTEMS," and U.S. Provisional Patent Application No. 61/479,282 filed Apr. 26, 2011 and entitled "UPLINK SOUNDING REFERENCE SIGNALS IN CARRIER AGGREGATED SYSTEMS." The content of the above-identified patent documents is incorporated herein by reference.

TECHNICAL FIELD

The present application relates generally to wireless networks and, more specifically, to a method or transmitting an uplink sounding reference signal (SRS) from a mobile station to a base station.

BACKGROUND

The following documents and standards descriptions are hereby incorporated into the present disclosure as if fully set forth herein: i) 3GPP Technical Specification No. 36.211, version 8.8.0, "E-UTRA, Physical Channels and Modulation," September 2009 ("REF1"); ii) 3GPP Technical Specification No. 36.212, version 8.8.0, "E-UTRA, Multiplexing And Channel Coding," December 2009, ("[REF2]"); iii) 3GPP Technical Specification No. 36.213, version 8.8.0, "E-UTRA, Physical Layer Procedures," September 2009, ("[REF3]"); iv) Document No. R1-102578, "Way Forward on UL Power Control with Carrier Aggregation," 3GPP RAN1#60bis, April 2010; and RAN1#60bis—Chairman's note.

Sounding reference signal (SRS) transmission methods are discussed in Release 8 (Rel-8) of the 3GPP Standard in the LTE references [REF1], [REF2] and [REF3] above. A sounding reference signal is transmitted in the uplink from a mobile station to a base station. The base station uses the SRS to determine the characteristics of the channel from the mobile station to the base station.

The base station configures the mobile station to periodically transmit an SRS by radio resource control (RRC) layer signaling. The RRC signaling configures, for example, the period of the SRS transmitted by the mobile station and the resources used (e.g., subcarriers, time slots, cyclic shift, etc.). In Release 8, a sounding reference signal is periodically transmitted by the mobile station on the last single carrier frequency division multiplexing (SC-FDM) symbol in a specifically configured subframe. The power level for SRS SC-FDM symbols may be different (offset) from the power level in physical uplink shared channel (PUSCH)SC-FDM symbols.

However, in Release 10 of the Long Term Evolution Advanced (LTE-A) standard, which is a candidate 4G system to be incorporated in the 3GPP LTE standard, it is proposed that SRS transmissions be performed aperiodically in response to a trigger message transmitted by a base station.

Therefore, there is a need in the art for improved apparatuses and methods for transmitting sounding reference signals aperiodically from a mobile station to a base station. In particular, there is a need for improved apparatuses and methods for configuring the bandwidth and the transmit power levels of the aperiodically transmitted sounding reference signals.

SUMMARY

A mobile station is provided for use in a wireless network that operates according to the Long-Term Evolution Advanced standard. The mobile station is operable to transmit an aperiodic sounding reference signal (SRS) to a base station in response to a triggering grant received from the base station. The bandwidth on which the mobile station transmits the aperiodic SRS depends on a type of the triggering grant. The type of the triggering grant is one of a downlink grant, an uplink multiple-input, multiple-output (MIMO) grant, and an uplink single-input, multiple-output (SIMO) grant.

A base station is provided for use in a wireless network that operates according to the Long-Term Evolution Advanced standard. The base station is operable to receive an aperiodic sounding reference signal (SRS) from a mobile station. The base station transmits a triggering grant to the mobile station. In response, the base station receives the aperiodic SRS on a bandwidth that depends on a type of the triggering grant. The type of the triggering grant is one of a downlink grant, an uplink multiple-input, multiple-output (MIMO) grant, and an uplink single-input, multiple-output (SIMO) grant.

A mobile station for use in a wireless network that operates according to the Long-Term Evolution Advanced standard. The mobile station is operable to transmit a sounding reference signal (SRS) in a SC-FDM symbol. The sounding reference signal is transmitted on at least two component carriers. If the total transmit power of the SC-FDM symbol associated with the sounding reference signal exceeds a maximum transmit power level, $P_{CMAX}$, of the mobile station, the mobile station scales the transmit power level of each of the at least two component carriers on which the sounding reference signal is transmitted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5 and 6 illustrate exemplary SRS transmission scenarios in a carrier aggregated system.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
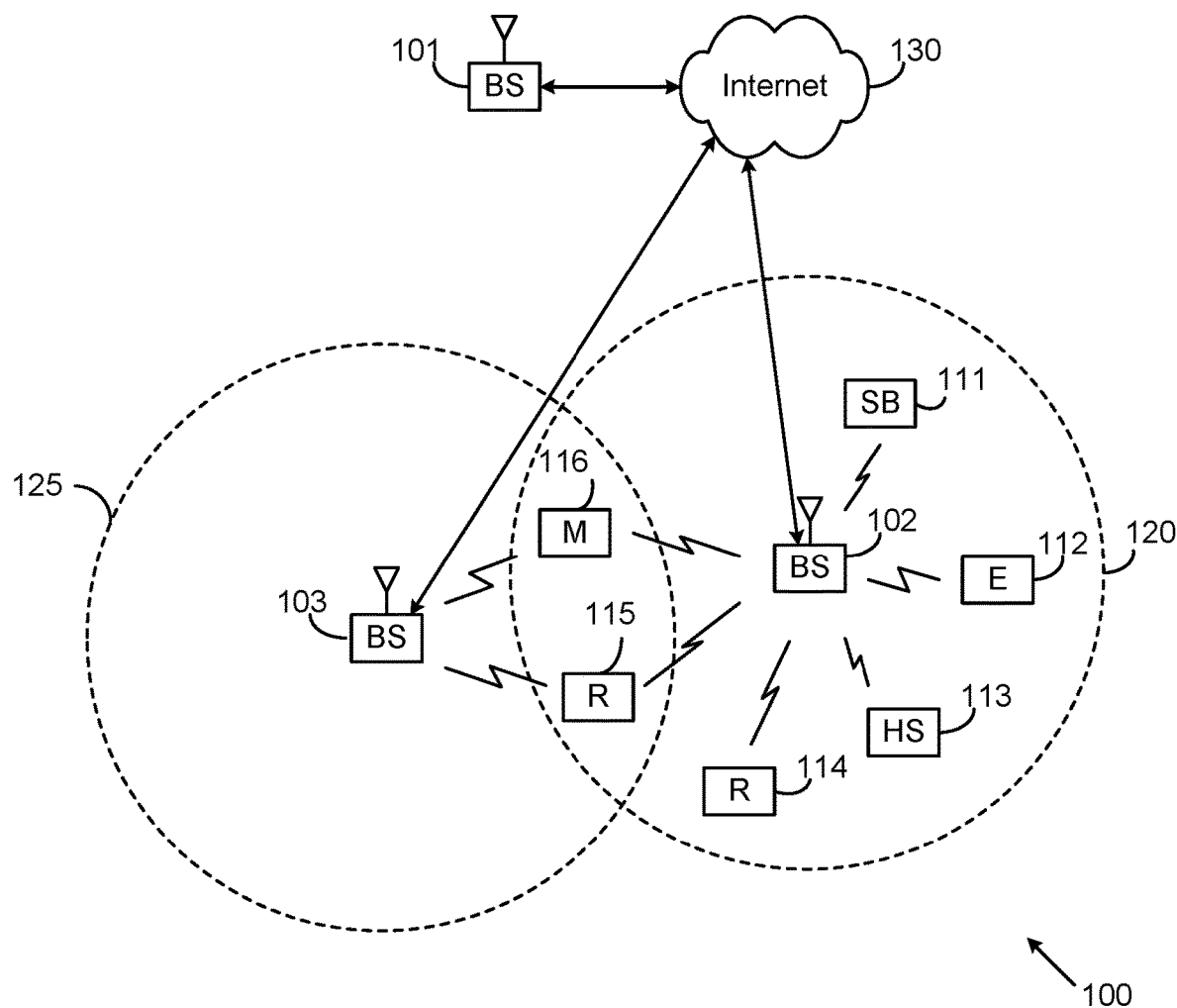
FIG. 1 illustrates an exemplary wireless network that transmits uplink sounding reference signals according to the principles of the present disclosure.

FIG. 1 illustrates exemplary wireless network 100, which transmits uplink sounding reference signals according to the principles of the present disclosure. Wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations within coverage area 120 of base station 102. The first plurality of subscriber stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For the sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). In other systems, other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Exemplary descriptions of closed-loop transmit beamforming schemes based on codebook design can be found in: 1) D. Love, J. Heath, and T. Strohmer, "Grassmannian Beamforming For Multiple-Input, Multiple-Output Wireless Systems," IEEE Transactions on Information Theory, October 2003, and 2) V. Raghavan, A. M. Sayeed, and N. Boston, "Near-Optimal Codebook Constructions For Limited Feedback Beamforming In Correlated MIMO Channels With Few Antennas," IEEE 2006 International Symposium on Information Theory. Both references are hereby incorporated by reference into this disclosure as if fully set forth herein.

Closed-loop codebook-based transmit beamforming may be used in a case where a base station forms a transmit antenna beam toward a single user or simultaneously toward multiple users at the same time and at a certain frequency. An exemplary description of such a system may be found in Quentin H. Spencer, Christian B. Peel, A. Lee Swindlehurst, Martin Harrdt, "An Introduction To the Multi-User MIMO Downlink," IEEE Communication Magazine, October 2004, which is hereby incorporated by reference into this disclosure as if fully set forth herein.

A codebook is a set of pre-determined antenna beams that are known to mobile stations. A codebook-based pre-coding MIMO may provide significant spectral efficiency gain in the downlink closed-loop MIMO. In the IEEE 802.16e and 3GPP LTE standards, a four transmit (4-TX) antenna limited feedback based closed-loop MIMO configuration is supported. In IEEE 802.16m and 3GPP LTE Advanced standards, in order to provide peak spectral efficiency, eight transmit (8-TX) antenna configurations are proposed as a prominent precoding closed-loop MIMO downlink system. Exemplary descriptions of such systems may be found in 3GPP Technical Specification No. 36.211, "Evolved Universal Terrestrial Radio Access (E-UTRA): Physical Channel and Modulation", which is hereby incorporated by reference into this disclosure as if fully set forth herein.

To eliminate the need for the phase-calibration process in cases where channel sounding signals or common pilot signals (or midamble) are not used for data demodulation purpose, closed-loop transformed codebook-based transmit beamforming may be utilized. An exemplary description of such a system may be found in IEEE C802.16m-08/1345r2, "Transformation Method For Codebook Based Precoding," November 2008, which is hereby incorporated by reference into this disclosure as if fully set forth herein. The transformed codebook method utilizes the channel correlation information to enhance the performance of the standard codebook, especially in the highly correlated channels, as well as to eliminate the need of phase calibration among multiple transmit antennas. Typically, the channel correlation information is based on second-order statistics and thus changes very slowly, which is similar to long-term channel effects, such as shadowing and path loss. As a result, the feedback overhead and computation complexity using correlation information are very small.

Figure 2:
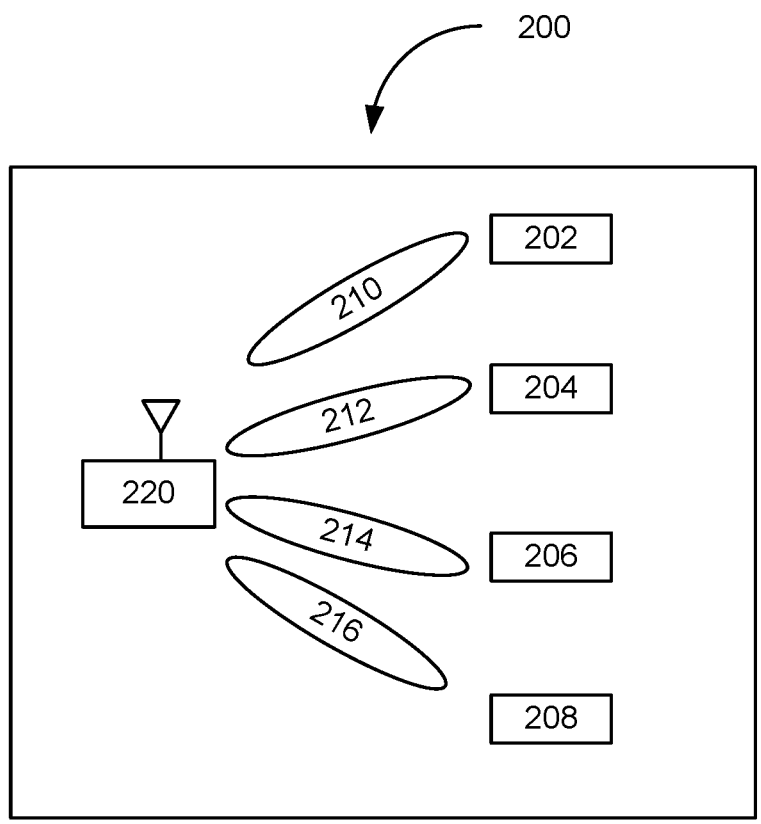
FIG. 2 illustrates a base station in communication with a plurality of mobile stations according to an embodiment of the disclosure.

FIG. 2 illustrates diagram 200 of base station 220 in communication with a plurality of mobile stations 202, 204, 206, and 208 according to an embodiment of the disclosure. Base station 220 and mobile stations 202, 204, 206, and 208 employ multiple antennas for transmission and reception of radio wave signals. The radio wave signals may be Orthogonal Frequency Division Multiplexing (OFDM) signals.

In FIG. 2, base station 220 performs simultaneous beamforming through a plurality of transmitters to each mobile station. For instance, base station 220 transmits data to mobile station 202 through beamformed signal 210, data to mobile station 204 through beamformed signal 212, data to mobile station 406 through beamformed signal 214, and data to mobile station 408 through beamformed signal 216. In some embodiments, base station 220 may perform simultaneous beamforming to mobile stations 202, 204, 206, and 208. Each beamformed signal may be formed toward its intended mobile station at the same time and the same frequency. For the purpose of clarity, the communication from a base station to a mobile station may also be referred to as downlink communication and the communication from a mobile station to a base station may be referred to as uplink communication.

Base station 220 and mobile stations 202, 204, 206, and 208 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 202, 204, 206, and 208 may be any device that is capable of receiving wireless signals. Examples of mobile stations 202, 204, 206, and 208 include, but are not limited to, a personal data assistant (PDA), laptop, mobile telephone, handheld device, or any other device that is capable of receiving the beamformed transmissions.

An OFDM transmission scheme is used to multiplex data in the frequency domain. Modulation symbols are carried on frequency sub-carriers. The quadrature amplitude modulation (QAM) modulated symbols are serial-to-parallel converted and input to the inverse fast Fourier transform (IFFT). At the output of the IFFT, N time-domain samples are obtained. Here N refers to the IFFT/fast Fourier transform (FFT) size used by the OFDM system. The signal after IFFT is parallel-to-serial converted and a cyclic prefix (CP) is added to the signal sequence. The CP is added to each OFDM symbol to avoid or mitigate the impact due to multipath fading. The resulting sequence of samples is referred to as an OFDM symbol with a CP. At the receiver side, assuming that perfect time and frequency synchronization are achieved, the receiver first removes the CP, and the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in time domain, the sub-carriers overlap with each other in frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier-interference (ICI).

The use of multiple transmit antennas and multiple receive antennas at both a base station and a single mobile station to improve the capacity and reliability of a wireless communication channel is known as a Single User Multiple-Input, Multiple-Output (SU-MIMO) system. A MIMO system provides a linear increase in capacity with K, where K is the minimum of the number of transmit antennas (M) and receive antennas (N) (i.e., K=min(M,N)). A MIMO system can be implemented with the schemes of spatial multiplexing, transmit and receive beamforming, or transmit and receive diversity.

Figure 3:
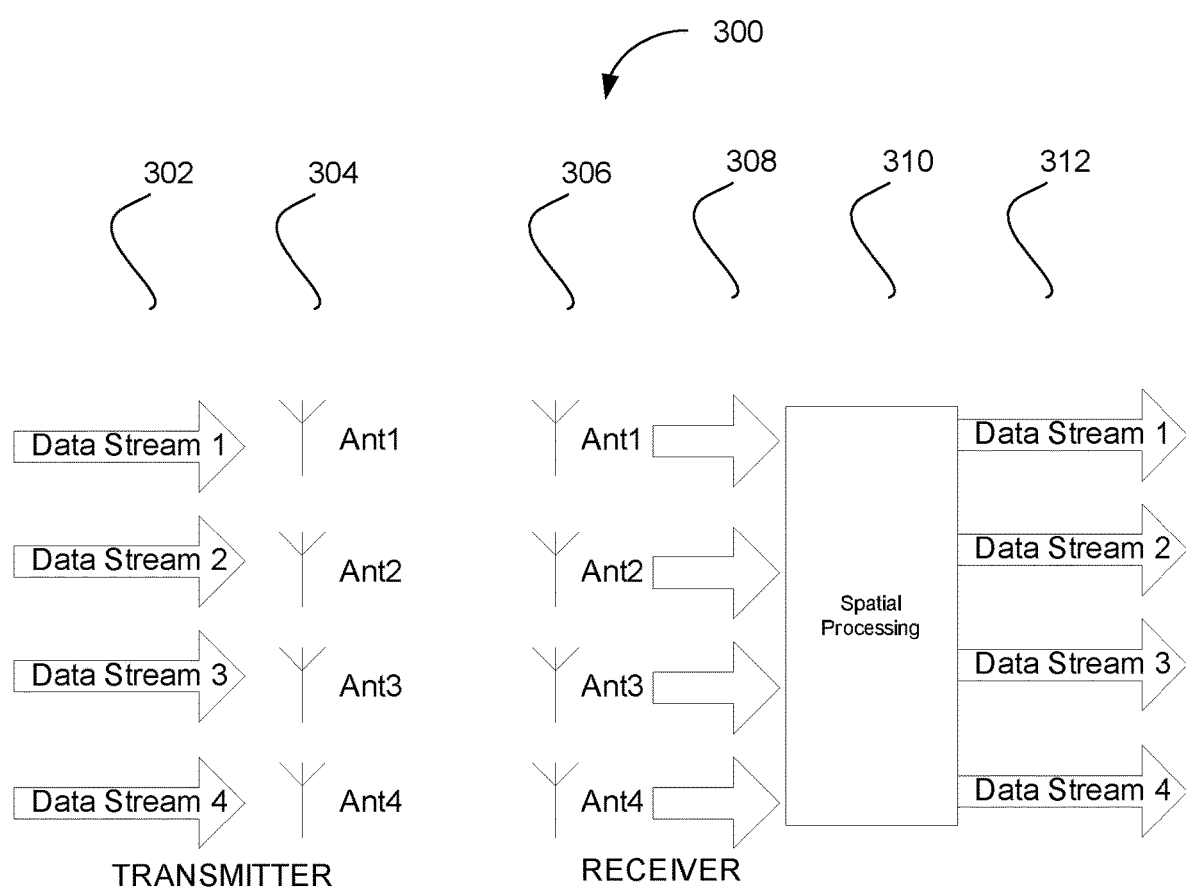
FIG. 3 illustrates a 4×4 multiple-input, multiple-output (MIMO) system according to an embodiment of the disclosure.

FIG. 3 illustrates a 4×4 multiple-input, multiple-output (MIMO) system 300 according to an embodiment of the disclosure. In this example, four different data streams 302 are transmitted separately using four transmit antennas 304. The transmitted signals are received at four receive antennas 306 and interpreted as received signals 308. Some form of spatial signal processing 310 is performed on the received signals 308 in order to recover four data streams 312.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit and receive diversity scheme and a transmit and receive beamforming scheme to improve the link reliability or system capacity in wireless communication systems.

Aperiodic SRS Triggering

As noted above, both Release 8 (Rel-8) and Release 10 (Rel-10) of the Long Term Evolution Advanced (LTE-A) standard propose to use sounding reference signals that are transmitted in the uplink from a mobile station to a base station. A base station uses a sounding reference signal (SRS) to determine the channel characteristics from the mobile station to the base station. However, while Rel-8 of LTE-A uses periodic SRS schemes that are configured by the base station, in Rel-10 LTE-A, a new mechanism to trigger SRS in a mobile station (MS) is being introduced, namely, aperiodic SRS triggering.

When an SRS is aperiodically triggered, a MS receives a control signal in the physical (PHY) layer of a first subframe. In response, the MS transmits an SRS a few subframes later. The control signal in the PHY layer that triggers aperiodic SRS may trigger only one SRS transmission in only one subframe, or it may trigger multiple SRS transmissions in multiple subframes. The SRS bandwidth in which the MS transmits sounding reference signals may be configured in a higher-layer signaling, such as radio resource control (RRC) layer signaling.

There are two types of uplink (UL) transmission modes in LTE-A. One mode is Single-Input, Multiple-Output (SIMO) and the other mode is Multiple-Input, Multiple-Output (MIMO). If SIMO mode is configured, a mobile station transmits signals on only one antenna port. Alternatively, if an N transmit antenna (or N-Tx) MIMO mode is configured, a mobile station may transmits signal on multiple (i.e., N) antenna ports. TABLE 1 shows exemplary UL transmission modes for different configurations of the Physical Downlink Control Channel (PDCCH) and the Physical Uplink Control Channel (PUSCH):

TABLE 1

PDCCH and PUSCH configured by C-RNT1 assuming same size for DCI formats 0 and 0A

| UL Transmission mode | DCI format | Search Space | Transmission scheme of PUSCH corresponding to PDCCH |
|---|---|---|---|
| UL Mode 1 (UL SIMO) | DCI format 0 | Common and UE specific by C-RNTI | Single-antenna port, contiguous BW allocation |
| | DCI format 0A | UE specific by C-RNTI | Single-antenna port, non-contiguous BW allocation |
| UL Mode 2 (UL MIMO mode with N antenna ports) | DCI format 0/0A (A fallback grant) | Common and UE specific by C-RNTI | Single-antenna port, contiguous or non-contiguous BW allocation |
| | DCI format 0/0A (A normal grant) | UE specific by C-RNTI | n-layer precoding, where n = 1, . . . , N |

In TABLE 1, PDCCH and PUSCH are configured by the Cell RNTI (C-RNTI), where RNTI is the Radio Network Temporary Identifier. C-RNTI may be considered as a unique UE-ID within a cell. In TABLE 1, "UE specific" has the same meaning as "MS specific."

In one embodiment of the disclosure, a mobile station transmits on a different number of aperiodic SRS ports depending on the configured UL transmission mode. For example, if an UL SIMO mode is configured, then the mobile station transmits a SRS on a single antenna port when aperiodic SRS is triggered. If an N transmit antenna (N-Tx) UL MIMO mode is configured, then the mobile station transmits SRS on N transmit antenna ports when aperiodic SRS is triggered.

In one embodiment of the disclosure, a mobile station transmits on a different number of aperiodic SRS ports depending on both the configured UL mode and the configured DL transmission mode. In addition, the SRS transmission may be dependent on the mobile station configured reporting mode. For example, in a first configuration, if a mobile station is configured in UL MIMO transmission mode, then the mobile station transmit sounding reference signals (SRSs) on all N UL Tx antenna ports regardless of the configured DL transmission mode. In a second configuration, if a mobile station is configured in UL SIMO transmission mode and DL transmission mode that supports only single layer transmission, then the mobile station transmits sounding reference signals on a single UL Tx antenna port. In a third configuration, if a mobile station is configured in UL SIMO transmission mode, but is also configured in a DL multi-port transmission mode, then there may be two possible alternatives: i) in a first alternative, the mobile station transmit an SRS on all N UL Tx antenna ports, and ii) in a second alternative, if the precoding matrix indicator (PMI)/channel quality indicator (CQI) report is configured, then the mobile station transmits an SRS on single UL Tx antenna port; if the PMI/CQI report is not configured, then the mobile station transmits and SRS on N UL Tx antenna ports.

In another embodiment of the disclosure, a mobile station transmits on a different number of aperiodic SRS ports depending on the DCI format of the triggering UL grant or the triggering DL grant. For example, in a mobile station configured in an N-Tx UL MIMO mode, if the UL grant triggering aperiodic SRS is a fall-back grant asking the mobile station to do MS-autonomous single-layer transmission (or a transparent transmit diversity transmission), then the mobile station shall transmit aperiodic SRS on a MS-autonomously constructed single-antenna port. Alternatively, if the UL grant triggering aperiodic SRS is a normal transmission grant for the UL MIMO mode which is asking the mobile station to do n-layer beamforming, where n=1, 2, . . . , N, then the mobile station may transmit aperiodic SRS on all the N antenna ports. An example of the normal and the fallback grants in a UL MIMO mode (denoted by UL mode 2) is shown in TABLE 1. The reason for this method is that in case the base station sends a mobile station a fall-back transmission grant, the mobile station is likely to be in a power-limited regime, in which case it would be better to place total transmission power on one SRS antenna port, rather than to distribute the power on multiple SRS ports.

In one embodiment of the disclosure, a mobile station transmits a different bandwidth (BW) of aperiodic SRS depending on the DCI format of the triggering UL grant or the triggering DL grant. For example, if a mobile station is configured either in an UL MIMO mode or an UL SIMO mode and the UL grant triggering aperiodic SRS schedules a single-layer transmission from a mobile station (i.e., UL transmission rank=1), then the mobile station may transmit aperiodic SRS within a first bandwidth, denoted by BW1. On the other hand, if the UL grant triggering aperiodic SRS schedules a multiple-layer transmission from a mobile station (i.e., UL transmission rank>1), then the mobile station shall transmit aperiodic SRS within a second bandwidth, denoted by BW2. The BW1 and BW2 bandwidths may be configured in an RRC signaling by the base station. By way of example, a base station may configure BW1 as a subset of BW2, so that the BW in which a mobile station transmits the SRS shrinks when the mobile station is triggered to perform an aperiodic SRS with a fallback transmission grant.

In one embodiment of the disclosure, a mobile station may transmit an aperiodic SRS in a different subframe n+k, depending on the UL grant, the DL grant, or both, triggering the aperiodic SRS in an UL component carrier (CC) (or a cell), than the subframe n in which the mobile station received the UL and/or DL grant, where n and k are non-negative integers. For example, the number of antenna ports on which the mobile station transmits aperiodic SRS, and/or the bandwidth in which the mobile station transmits aperiodic SRS may change, depending on the UL grant and/or the DL grant.

Here, an aperiodic SRS may be triggered by a transmission grant setting one codepoint to a designated value. By way of example, an aperiodic SRS may be triggered by a cyclic-shift information (CSI) partition. If a CSI in the UL grant (e.g., DCI format 0) belongs to a first subset of CSI indices, then an aperiodic SRS may be triggered. Otherwise, an aperiodic SRS is not triggered. An example is shown below:

| CSI | Aperiodic SRS |
|---|---|
| 000, 001, 010, 011 | Triggered |
| 100, 101, 110, 111 | Not triggered |

In another example, an aperiodic SRS may be triggered by a frequency hopping bit. If the frequency hopping bit in the UL grant (e.g., DCI format 0) is 1, then an aperiodic SRS is triggered. Otherwise, an aperiodic SRS is not triggered. An example is shown below:

| Frequency hopping bit | Aperiodic SRS |
|---|---|
| 0 | Triggered |
| 1 | Not triggered |

In still another example, an aperiodic SRS may be triggered by a padding bit. If the padding bit in the UL grant (e.g., DCI format 0) is 1, then an aperiodic SRS is triggered. Otherwise, an aperiodic SRS is not triggered. An example is shown below:

| Padding bit | Aperiodic SRS |
|---|---|
| 0 | Triggered |
| 1 | Not triggered |

In still another example, an aperiodic SRS may be triggered if an explicit one bit for SRS triggering is included only in the DCI format 0 transmitted in the MS-specific search space. However, the explicit one bit for SRS triggering is not included in the DCI format 0 transmitted in the cell-specific search space.

Figures 4A, 4B:
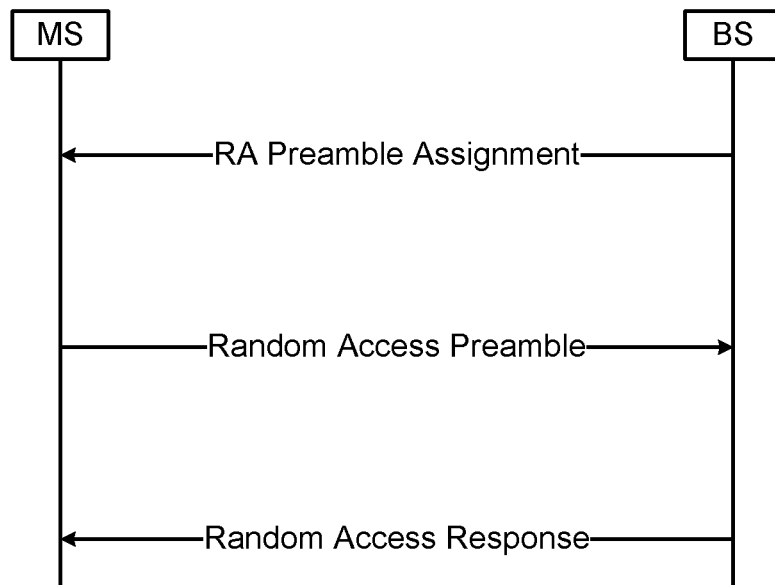
FIGS. 4A and 4B illustrate the triggering of an aperiodic SRS by a Random Access Channel (RACH) response.

FIGS. 4A and 4B illustrate the triggering of an aperiodic SRS by a Random Access Channel (RACH) response. In FIG. 4A, a base station transmits an Random Access (RA) Preamble Assignment message to a mobile station. The mobile station responds by transmitting a Random Access Preamble message to the base station. Finally, the base station transmits a Random Access Response message to the mobile station. In this embodiment, an aperiodic SRS is transmitted together with an UL transmission granted by an UL grant in the RACH response transmitted in the MAC layer in the non-contention based random access procedure.

FIG. 4B illustrates the Random Access Response message transmitted from the base station to the mobile station in greater detail. The illustrated portion of the Random Access Response message comprises 6 octets containing e bits each. The first bit in Octet 1 is reserved (R). If the reserved bit in the MAC-layer Random Access Response (RAR) message is set to binary 1, then an aperiodic SRS is triggered. Otherwise, the aperiodic SRS is not triggered.

The following examples illustrate how mobile station behavior with respect to aperiodic SRS transmission changes depending on the UL grant, the DL grant or both. In a first example, multi- or single-antenna port SRS transmission may depend on an UL transmission rank configured in an UL grant sent in subframe n. If a mobile station is configured in N-Tx UL MIMO mode and the UL grant triggering aperiodic SRS schedules a single-layer transmission from a mobile station (i.e., UL transmission rank=1), then the mobile station may transmit aperiodic SRS on a single-antenna port for the SIMO transmission. Alternatively, if the UL grant triggering aperiodic SRS schedules a multiple-layer transmission from a mobile station (i.e., UL transmission rank>1), then the mobile station may transmit aperiodic SRS on all the N antenna ports.

In a second example, the SRS bandwidth (BW) may depend on an UL transmission rank configured in an UL grant sent in a subframe n. If a mobile station is configured in an UL MIMO mode and the UL grant triggering an aperiodic SRS is a fall-back grant asking the mobile station to perform MS-autonomous single-layer transmission (or a transparent transmit diversity transmission), then the mobile station may transmit an aperiodic SRS within a first bandwidth, denoted by BW1. On the other hand, if the UL grant triggering an aperiodic SRS is a normal transmission grant for the UL MIMO mode asking the mobile station to perform n-layer beamforming, where n=1, . . . N, then the mobile station may transmit an aperiodic SRS within a second bandwidth, denoted by BW2. The bandwidths BW1 and BW2 may be configured by an RRC signaling sent by the base station. In an exemplary embodiment, a base station may configure BW1 as a subset of BW2, so that the BW in which a mobile station transmits an SRS shrinks when the mobile station is triggered to transmit an aperiodic SRS with a fallback transmission grant.

In a third example, the SRS bandwidth depends on whether an UL grant, a DL grant, or both, triggers an aperiodic SRS. If a mobile station is configured either in an UL MIMO mode or an UL SIMO mode and if only the UL grant triggers an aperiodic SRS, then the mobile station may transmit an aperiodic SRS within a first bandwidth, denoted by BW1. If only the DL grant triggers an aperiodic SRS, then the mobile station may transmit an aperiodic SRS within a second bandwidth, denoted by BW2. The bandwidths BW1 and BW2 may be configured by an RRC signaling sent by the base station.

Multiple Aperiodic SRS Triggering in Carrier Aggregation

In one embodiment of the disclosure, a base station may trigger from a mobile station simultaneous aperiodic SRS (a-SRS) transmissions on more than one component carrier (CC).

In a first alternative embodiment, the base station transmits separate UL and DL triggering grants for triggering a-SRS on different UL component carriers, one UL or DL triggering grant for each UL component carrier SRS. When a mobile station receives multiple a-SRS triggering grants in subframe n, the mobile station first verifies whether or not the multiple triggering grants are consistent. Two triggering grants are consistent if the triggering grants trigger aperiodic SRS transmissions for the same subframe n in different component carriers. Two triggering grants are also consistent if the two triggering grants trigger an aperiodic SRS transmission in the same component carrier, in the same subframe n, and using the same SRS resources (e.g., same bandwidth). An SRS is transmitted only if the two triggering grants are consistent. If the triggering grants are not consistent, no periodic SRS is transmitted.

In a second alternative embodiment, a single triggering grant is transmitted for triggering a-SRS on multiple UL component carriers. In a first example of the second alternative embodiment, a higher-layer (RRC) configuration is signaled to a mobile station in order to configure a set of component carriers on which the mobile station should perform SRS transmission. The higher-layer configuration may be composed of 1 bit of information and each state indicates the SRS transmission configuration, as shown in TABLE 2 below.

TABLE 2 a-SRS Configuration

| State No. | CCs to transmit SRS |
|---|---|
| 0 | SIB2-linked UL CC (with the DL CC carrying the a-SRS triggering UL grant, or with the DL CC carrying the PDSCH scheduled by the a-SRS triggering DL grant) |
| 1 | All the activated UL CCs |

After a mobile station receives the higher-layer configuration, the mobile station transmits an a-SRS according to the higher-layer configuration regardless of which DCI format triggers the a-SRS.

When a mobile station receives multiple a-SRS triggering grants in the same subframe n, the mobile station first verifies whether or not the multiple grants are consistent. Two grants are not consistent when the two grants trigger a-SRS in different SRS resources. If two grants are consistent, the triggered a-SRS are transmitted. If two grants are not consistent, then all the SRS are dropped and not transmitted.

In a second example of the second alternative embodiment, an a-SRS transmission configuration table describing a set of component carriers on which the mobile station may transmit an a-SRS (e.g., TABLE 2 above) is either fixed in the wireless network or is signaled to the mobile station using higher-layer (RRC) signaling. Assuming that the a-SRS transmission configuration table has less than or equal to $2^b$ states, b-bit information is dynamically signaled in the SRS triggering grant to indicate a state to a mobile station. The b-bit information can be either implicitly or explicitly signaled. In one example of explicit signaling, a b-bit field is appended to an existing DCI format to indicate one state out of the $2^b$ states. For example, the information in the 1-bit field in TABLE 2 may be indicated by a 1-bit field appended to DCI format 0.

When a mobile station receives multiple a-SRS triggering grants in the same subframe n, the mobile station first verifies whether or not the multiple grants are consistent. Two grants are not consistent when the two grants trigger a-SRS in different SRS resources. If the two grants are consistent, the triggered a-SRS are transmitted. If the two grants are not consistent, all the SRS are dropped and not transmitted.

In a third example of the second alternative embodiment, a set of component carriers on which a mobile station may transmit an a-SRS is determined by the triggering DCI format. The set of component carriers on which each DCI format triggers an a-SRS may either be configured by higher-layer (RRC) or be fixed in the communication system. Furthermore, there may exist another higher-layer (RRC) configuration to switch on or off the dependency on DCI format of the set of component carriers to trigger a-SRS. If the dependency is off, any a-SRS triggering grant would trigger a-SRS in a CC according to the description in State 0 in TABLE 2 above.

When a mobile station receives multiple a-SRS triggering grants in the same subframe n, the mobile station first verifies whether or not the multiple grants are consistent. Two grants are not consistent when the two grants trigger a-SRS in different SRS resources. If two grants are consistent, the triggered a-SRS are transmitted. If two grants are not consistent, all the SRS are dropped and not transmitted.

By way of example, if DCI format 4 triggers a-SRS, then the a-SRS are transmitted in a component carrier (CC) according to the description in State 0 in TABLE 2 above. Otherwise, the a-SRS transmissions are transmitted in all the activated UL component carriers, as shown in TABLE 3 below. TABLE 3 may be configured by higher-layer (RRC) signaling or may be fixed in the wireless network. Since DCI format 4 is an UL MIMO DCI format that may trigger a multi-port a-SRS, it is expected to use more transmission power for transmission of the multi-port a-SRS than single port a-SRS. Therefore, it may not be desirable to trigger an a-SRS in all the activated component carriers when DCI format 4 triggers an a-SRS.

TABLE 3

| DCI format triggering a-SRS | CCs to transmit SRS |
|---|---|
| DCI format 4 (UL MIMO grants) | SIB2-linked UL CC (with the DL CC carrying the a-SRS triggering UL grant, or with the DL CC carrying the PDSCH scheduled by the a-SRS triggering DL grant) |
| DCI format 0/1A/1B/2B/2C (DL grants, and UL SIMO grants) | all the activated UL component carriers |

In a fourth example of the second alternative embodiment, a set of component carriers on which a mobile station should transmit the a-SRS is determined by the a-SRS parameter set configured by RRC. Furthermore, there may exist another higher-layer (RRC) configuration to switch on or off the dependency on a-SRS parameter set of the set of component carriers to trigger a-SRS and to define a mapping between a set of parameters and a set of component carriers to trigger an a-SRS. If the dependency is off, any a-SRS triggering grant may trigger an a-SRS in a component carrier according to the description in State 0 in TABLE 2 above. For example, an RRC configuration defines the mapping between a parameter set and a set of component carriers to trigger a-SRS as TABLE 4 below:

TABLE 4

| Parameter set | set 1 | set 2 | set 3 | set 4 | set 5 |
|---|---|---|---|---|---|
| Set of CCs to trigger a-SRS | All the activated CCs | SIB2-linked UL CC (with the DL CC carrying the a-SRS triggering UL grant, or with the DL CC carrying the PDSCH scheduled by the a-SRS triggering DL grant) | | | All the activated CCs |

When a mobile station receives multiple a-SRS triggering grants in the same subframe n, the mobile station first verifies whether the multiple grants are consistent or not. Two grants are not consistent when the two grants trigger a-SRS in different SRS resources. If the two grants are consistent, the triggered a-SRS are transmitted. If the two grants are not consistent, all the SRS are dropped and not transmitted.

The a-SRS parameter set is introduced in 3GPP RAN1 tdoc R1-110558, which is hereby incorporated by reference as if fully set forth herein. In tdoc R1-110558, it was proposed that a base station configures a table defining five (5) a-SRS parameter sets (set 1, set 2, . . . , set 5)—one table per configured component carrier (CC). The parameter set defines cyclic shift, transmission comb, SRS bandwidth, frequency domain position, number of antenna ports, Srs Configuration Index, and so on. The tdoc R1-110558 further proposed that set 1 is used when DCI format 0 (UL SIMO grant) triggers a-SRS, that sets 2, 3 and 4 are used when DCI format 4 (UL MIMO grant) triggers a-SRS, and that set 5 is used when at least a DL SIMO grant triggers a-SRS.

SRS Power Control in Carrier Aggregation

Figure 5:
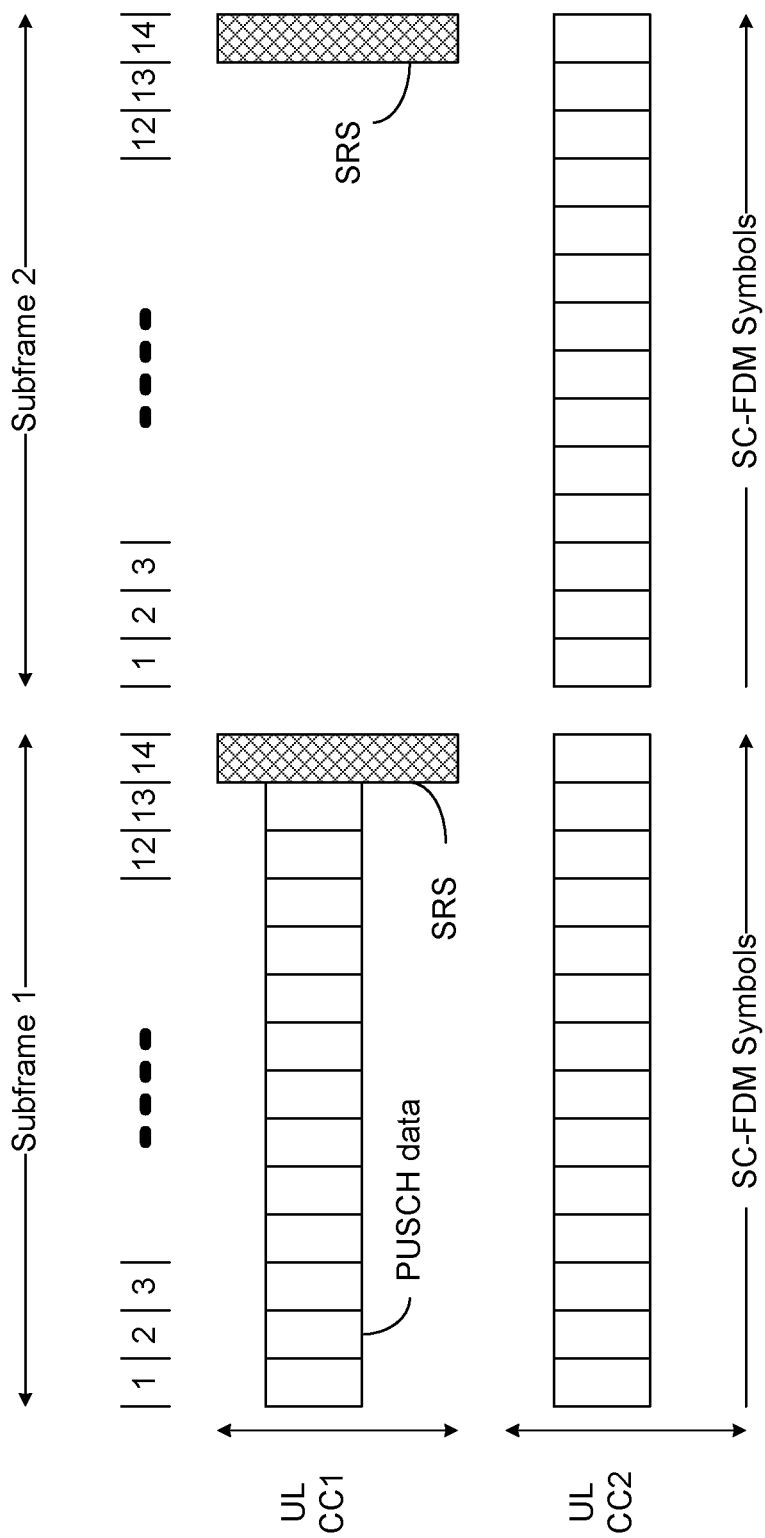

FIGS. 5 and 6 illustrate exemplary SRS transmission scenarios in a carrier aggregated system. A mobile station is configured to transmit signals (i.e., SC-FDM symbols) on two UL component carriers (or two cells), UL CC1 and UL CC2. In subframe 1 on the left side of FIG. 5, the mobile station is scheduled to transmit PUSCH data on both UL component carriers in a first subframe containing 14 symbols in consecutive time slots. The first 13 symbols (unshaded) on UL CC1 contain PUSCH data. The last SC-FDM symbol (shaded) is a sounding reference signal (SRS) that is scheduled on UL CC1. All 14 SC-FDM symbols on UL CC2 contain PUSCH data (unshaded).

In FIG. 5, the vertical height of the SRS symbol is greater than the vertical height of the PUSCH data symbols to indicate a greater power level. Because a mobile station may be configured to transmit an SRS SC-FDM symbol with a higher power than a PUSCH SC-FDM symbol on UL CC1, power overflow may occur on the SRS SC-FDM symbol, even if there is no power overflow on the non-SRS SC-FDM symbols. The term "power overflow" indicates that the sum power calculated from the power control equations on SRS and PUSCH is greater than the total transmission power, $P_{CMAX}$, of the mobile station. For example, if the power control equations are the agreed power control equations in REF4 and REF5 above, then the power overflow condition is:

$$P_{PUSCH,c}(i) + P_{SRS,c}(i) > P_{CMAX},$$

where $P_{SRS,c}(i)$ may be calculated as, for example:

$$P_{SRS,c}(i) = \min\{P_{CMAX,c}, P_{SRS\_OFFSET} + 10\log_{10}M_{SRS} + P_{O\_PUSCH,c}(j) + \alpha_c(j)PL + f_c(i)\}.$$

In subframe 2 on the right side of FIG. 5, a mobile station is scheduled to transmit PUSCH on UL CC2 and, at the same time, SRS is scheduled on UL CC1. The SRS is transmitted only in the last SC-FDM symbol of UL CC1 in subframe 2.

Finally, in FIG. 6, a mobile station is scheduled to transmit SRS on both UL component carriers in a subframe (i.e., UL CC1 and UL CC2). Again, in these examples, power overflow may occur on the SRS SC-FDM symbol, even if there is no power overflow on non-SRS SC-FDM symbols.

The following discussion describes a number of methods of resolving the power overflow in the SRS SC-FDM symbol in those case where PUSCH is transmitted on one UL CC and an SRS is transmitted on another UL CC in the same SC-FDM symbol. These methods are applied only for the SRS SC-FDM symbol. For the non-SRS SC-FDM symbol, a normal power scaling method as described in the prior art is used. Furthermore, when no power is allocated on PUSCH (or when PUSCH is dropped) on the SRS SC-FDM symbol on a UL CC in which a PUSCH scheduled, rate matching may be performed around the last SC-FDM symbol in the UL CC. When no PUCCH is scheduled in a particular subframe i, then $P_{PUCCH}(i)=0$.

For ease of explanation, it is assumed that all physical signals, PUCCH, PUSCH and SRS, are scheduled for a mobile station in a subframe of interest. If some physical signals are not scheduled for the mobile station in the subframe, a zero power level is assigned to those non-scheduled physical signals.

In a first advantageous method, an SRS is treated as PUSCH for the power scaling in the SRS SC-FDM symbol. If the total transmit power in the SRS SC-FDM symbol exceeds the mobile station maximum transmit power, $P_{CMAX}$, the mobile station scales the transmit power of each PUSCH (where PUSCH includes the SRS) such that:

$$\sum_c w_c P_{PUSCH,c}(i) \leq P_{CMAX} - P_{PUSCH,c}(i),$$

where $w_c$ is a scaling factor for PUSCH on component carrier c.

In another advantageous method, an SRS is treated as PUSCH for the power scaling in the SRS SC-FDM symbol. If the total transmit power in the SRS SC-FDM symbol exceeds the mobile station maximum transmit power, $P_{CMAX}$, the mobile station scales the transmit power of each SRS such that:

$$\sum_c w_c P_{SRS,c}(i) \leq P_{CMAX},$$

where $w_c$ is a scaling factor for SRS on component carrier c, and $P_{SRS,c}(i)$ is the power of the SRS for component carrier c in subframe i.

In a second method, the SRS is less preferred than the PUCCH data, but is more preferred than the PUSCH in the SRS SC-FDM symbol. In this case, full PUCCH transmission power is reserved for the SRS SC-FDM symbol and then full SRS powers are sequentially reserved for transmission according to an ordered list of UL component carriers with scheduled SRS in subframe i, until $P_{CMAX}$ is reached. If there is any remaining power after allocating all the SRS power, then the PUSCH powers are allocated. The following steps describe this second method in greater detail:

Step 1: If there is PUCCH transmission in subframe i, full PUCCH power, $P_{PUCCH}(i)$, is reserved first for the SRS-SC FDM symbol. Otherwise go directly to Step 2. If $P_{PUCCH}(i)$ exceeds $P_{CMAX}$, the mobile station transmits only PUCCH in subframe i.

Step 2: The mobile station adds the powers of each scheduled SRS, one after another, according to a priority ordered list containing the UL CC indices with scheduled SRS. Here, the priority ordered list can be written as $\{c(1), c(2), c(C_{SRS})\}$.

Step 3: Set m=1.

Step 4: If the total power obtained by adding the SRS power on UL CC c(m) exceeds $P_{CMAX}$, then only the PUCCH and SRS on UL component carriers c(1), . . . , c(m−1) are transmitted in subframe i. Otherwise, go to Step 5.

Step 5: Increment m by 1. If m equals $C_{SRS}+1$, then go to Step 6. Otherwise, go to Step 4.

Step 6: Scale down the PUSCH power according to the following formula:

$$\sum_c w_c P_{PUSCH,c}(i) \leq P_{CMAX} - \sum_{\{c(m)\}} P_{SRS,c(m)}(i) P_{PUCCH,c}(i).$$

This method guarantees that the SRS transmissions are always transmitted with a power as scheduled to facilitate the UL channel estimation at the base station. However, a mobile station may not transmit some scheduled SRS and PUSCH on the SRS SC-FDM symbol, and the base station may not aware of the dropped SRS and PUSCH.

In addition, the following set of priority among SRS transmissions is proposed: 1) aperiodic SRS is preferred over periodic SRS, 2) MIMO SRS is preferred over SIMO SRS, 3) SRS on UL PCC (or primary cell) is preferred over SRS on UL SCCs (or secondary cells), 4) a priority order list for the UL component carriers is conveyed in a higher-layer (RRC) signaling, only the SRS from a UL CC of the top priority according to the priority order list among the UL component carriers scheduled to transmit SRS, is transmitted, 5) a priority order list for the UL component carriers is conveyed in a higher-layer (RRC) signaling is transmitted, and 6) a CC with a smaller CC id is prioritized over another CC with a larger CC id for SRS transmission.

In a third method, an SRS is less preferred than PUCCH, but is more preferred than PUSCH in the SRS SC-FDM symbol. In addition, only one high-priority SRS will be kept while the other SRS will be dropped. In a first alternative of this third method, if there is any remaining power after allocating the SRS power, then PUSCH powers are allocated. The following steps describe this first alternative:

Step 1: If there is PUCCH transmission in subframe i, full PUCCH power, $P_{PUCCH}(i)$, is reserved first. Otherwise, go directly to Step 2. If $P_{PUCCH}(i)$ exceeds $P_{CMAX}$, the mobile station transmits only PUCCH in subframe i. Otherwise, go to Step 2.

Step 2: The mobile station adds power of the most preferred SRS, according to the predefined priority.

Step 3: If the total power obtained by adding the SRS power exceeds $P_{CMAX}$ then only the PUCCH is transmitted in subframe i.

Step 4: Scale down the PUSCH power according to the following formula:

$$\sum_c w_c P_{PUSCH,c}(i) \leq P_{CMAX} - P_{PUCCH}(i) - P_{SRS}(i).$$

In a second alternative of the third method, even if there is remaining power after allocating the SRS power, PUSCH data are dropped in the SRS SC-FDM symbol. This method guarantees that at most one SRS is transmitted with a power level as scheduled. The dropping behavior may be predictable at the base station, as the base station only needs to check whether the most preferred SRS is transmitted or not by energy detection. However, in the first alternative of the third method, as PUSCH power could vary across different SC-FDM symbols, the base station may not be able to correctly figure out the power level on the SRS SC-FDM symbol. In the second alternative of the third method, there is no such problem, as all PUSCHs are dropped on the SRS SC-FDM symbol.

In a fourth method, SRS is less preferred over PUCCH, while at most one SRS is preferred with dropping all the PUSCHs in the SRS SC-FDM symbol. In this case, full PUCCH transmission power is first reserved, and then one full SRS power is reserved for transmission according to a predefined priority. When PUSCHs are scheduled together with SRS (and PUCCH), PUSCH is dropped on the SRS SC-FDM symbol.

In one variation of the fourth method, SRS is less preferred than PUCCH, while at most N SRS are preferred with dropping all the PUSCHs in the SRS SC-FDM symbol, where N=1, 2, 3, . . . , and N can be either fixed or signaled by higher-layers. In this case, full PUCCH transmission power is first reserved, and then one full SRS power is reserved for transmission according to a predefined priority. When PUSCHs are scheduled together with SRS (and PUCCH), PUSCH is dropped on the SRS SC-FDM symbol.

In a fifth method, SRS is less preferred than PUCCH, with dropping all the PUSCHs in the SRS SC-FDM symbol. In this case, full PUCCH transmission power is first reserved, and then full SRS powers are reserved for transmission according to a predefined priority. When PUSCHs are scheduled together with SRS (and PUCCH), PUSCH is dropped on the SRS SC-FDM symbol. This method guarantees that SRS are always transmitted with a power as scheduled, to facilitate the UL channel estimation at the base station. However, it has a drawback that a mobile station may not transmit some scheduled SRS and PUSCH on the SRS SC-FDM symbol, and the base station may not aware of the dropped SRS and PUSCH.

In a sixth method, SRS is less preferred over PUCCH, and SRS transmissions are scaled down (if needed) so that the total transmission power does not exceed $P_{CMAX}$, and all the PUSCHs are dropped in the SRS SC-FDM symbol. In this case, full PUCCH transmission power is first reserved, and then SRS powers are scaled down (if needed) so that the total transmission power does not exceed $P_{CMAX}$. When PUSCHs are scheduled together with SRS (and PUCCH), PUSCH is dropped on the SRS SC-FDM symbol. This method may not be desirable when the base station does not know whether a mobile station does power scale down for SRS or not. However, this method guarantees that all scheduled SRS and PUCCH are transmitted on the SRS SC-FDM symbol.

In a seventh method, in the SRS SC-FDM symbol, SRS is less preferred than PUCCH, but is more preferred than PUSCH with UCI. PUSCH without UCI is least preferred. In this case, the priority order list is PUCCH>SRS>PUSCH with UCI>PUSCH without UCI. On the SRS SC-FDM symbol, full PUCCH power is first reserved. If there is any remaining power after assigning the full PUCCH power, SRS take the remaining power.

In one alternative, only one SRS is transmitted with full power according to a predefined priority list for SRS. After assigning power to SRS and PUCCH, if there is any remaining power, the remaining power is first assigned to PUSCH with UCI. If the remaining power is larger than or equal to a PUSCH power for the PUSCH with UCI, i.e., $P_{PUSCH,j}(i)$, then the remaining power is assigned to the PUSCH with UCI and no power is assigned to PUSCH without UCI. Otherwise, the remaining power after assigning to PUSCH with UCI will be assigned to PUSCHs without UCI, according to the power scaling formula:

$$\sum_c w_c P_{PUSCH,c}(i) \leq P_{CMAX} - P_{PUCCH}(i) - P_{SRS}(i) - P_{PUSCH,j}(i).$$

Obviously, when no PUSCH with UCI is scheduled in the subframe i, $P_{PUSCH,j}(i)=0$.

In another alternative, a number of SRS can be transmitted with full power according to a predefined priority list for SRS. After assigning power to PUCCH, a mobile station attempts to assign full power to SRS scheduled in the subframe, one after another. If total power exceeds $P_{CMAX}$ by adding n-th SRS, the n-th SRS is dropped and only (n−1) SRS and PUCCH are transmitted. If there is any remaining power after assigning full powers to SRS, it is attempted to assign power to PUSCH with UCI. If the remaining power is larger than or equal to a PUSCH power for the PUSCH with UCI, i.e., $P_{PUSCH,j}(i)$, then the remaining power is assigned to the PUSCH with UCI and no power is assigned to PUSCH without UCI. Otherwise, the remaining power after assigning to PUSCH with UCI will be assigned to PUSCHs without UCI, according to the power scaling formula:

$$\sum_c w_c P_{PUSCH,c}(i) \le P_{CMAX} - P_{PUCCH}(i) - \sum_{\{c(m)\}} P_{SRS,c(m)}(i) P_{PUCCH,j}(i).$$

Obviously, when no PUSCH with UCI is scheduled in the subframe i, $P_{PUCCH,j}(i)=0$.

In an eighth method, the priority order list for the power control in the SRS SC-FDM symbol is the following: PUCCH>aperiodic SRS>PUSCH (with or without UCI)>periodic SRS. After assigning full power to PUCCH, a mobile station attempts to assign full power to an aperiodic SRS. In the case where there is any PUSCH scheduled together with SRS, after assigning power to aperiodic SRS and PUCCH, if there is any remaining power, the remaining power is first assigned to PUSCH with UCI. If the remaining power is larger than or equal to a PUSCH power for the PUSCH with UCI, i.e., $P_{PUCCH,j}(i)$, then the remaining power is assigned to the PUSCH with UCI and no power is assigned to PUSCH without UCI. Otherwise, the remaining power after assigning to PUSCH with UCI will be assigned to PUSCHs without UCI, according to the power scaling formula:

$$\sum_c w_c P_{PUSCH,c}(i) \le P_{CMAX} - P_{PUCCH}(i) - P_{SRS,aperiodic}(i) - P_{PUSCH,j}(i).$$

Obviously, when no PUSCH with UCI is scheduled in the subframe i, $P_{PUSCH,j}(i)=0$. In addition, when no aperiodic SRS is scheduled in subframe i $P_{SRS,aperiodic}(i)=0$. In this case, periodic SRS are dropped.

In the case where there is no PUSCH scheduled together with SRS, then the remaining power is assigned to periodic SRS according to a predefined priority list.

In a ninth method, the priority order list for the power control in the SRS SC-FDM symbol is the following: PUCCH>aperiodic SRS>PUSCH with UCI>periodic SRS. If there are PUSCHs without UCI, those PUSCHs are dropped in the SRS SC-FDM symbol. After assigning full power to PUCCH, a mobile station attempts to assign full power to an aperiodic SRS. In the case where there is any PUSCH with UCI scheduled together with SRS, after assigning power to aperiodic SRS and PUCCH, if there is any remaining power, the remaining power is assigned to PUSCH with UCI. If the remaining power is larger than or equal to a PUSCH power for the PUSCH with UCI, i.e., $P_{PUSCH,j}(i)$ then the remaining power is assigned to the PUSCH with UCI and no power is assigned to periodic SRS. Otherwise, the remaining power after assigning to PUSCH with UCI will be assigned to periodic SRS, according to a predefined priority list.

In the case where there is no PUSCH scheduled together with SRS, then the remaining power is assigned to periodic SRS according to a predefined priority list.

In a tenth method, the priority order list for the power control in the SRS SC-FDM symbol is the following: PUCCH>MIMO SRS>PUSCH (with or without UCI)>non-MIMO SRS. The subsequent procedure of power assigning follows the eighth method describe above.

In an eleventh method, the priority order list for the power control in the SRS SC-FDM symbol is the following: PUCCH>MIMO SRS>PUSCH with UCI>non-MIMO SRS. If there are PUSCHs without UCI, those PUSCHs are dropped in the SRS SC-FDM symbol. The subsequent procedure of power assigning follows the ninth method describe above.

In a twelfth method, when multiple periodic SRS are scheduled in a subframe and no aperiodic SRS is scheduled, all the scheduled periodic SRS are transmitted according to the first method describe above (i.e., the powers of periodic SRS are scaled down if power limited). In other words, $$\sum_c w_c P_{SRS,c}(i) \le P_{CMAX}.$$

On the other hand, when an aperiodic SRS is scheduled together with multiple periodic SRS in a subframe, the mobile station transmits only the aperiodic SRS and drops the multiple periodic SRS.

This method guarantees that at least the aperiodic SRS are transmitted with a scheduled power. In addition, the periodic SRS dropping behavior is predictable at the BS, as the BS triggers the aperiodic SRS in the subframe where periodic SRS are scheduled.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal for a communication system, the method comprising:
   identifying a sounding reference signal (SRS) transmit power by power scaling based on a scaling factor if a total transmit power of a symbol for an SRS exceeds a user equipment (UE) maximum transmit power;
   when the SRS is transmitted on at least two component carriers, scaling transmit power of the SRS on each of the at least two component carriers based on following equation:

$$\sum_c w_c P_{SRS,c}(i) \le P_{CMAX}$$

where $P_{CMAX}$ is the UE maximum transmit power, $w_c$ is a scaling factor, and $P_{SRS,c}$ is the transmit power of the SRS on a component carrier c of the at least two component carriers;
   identifying an SRS bandwidth based on a grant which triggers the SRS; and
   transmitting the SRS based on the identified SRS transmit power and SRS bandwidth.

2. The method of claim 1, wherein the scaling factor is the same on the component carriers.

3. The method of claim 1, wherein if the grant is an uplink grant, the SRS bandwidth is determined as a first bandwidth and if the grant is a downlink grant, the SRS bandwidth is determined as a second bandwidth.

4. The method of claim 1, wherein the SRS in a subframe on a component carrier is triggered based on at least one grant which is associated with same SRS parameters.

5. A method of a base station for a communication system, the method comprising:
- transmitting a grant which triggers a sounding reference signal (SRS);
- receiving the SRS based on an SRS transmit power and an SRS bandwidth,
- wherein the SRS transmit power is identified by power scaling based on a scaling factor if a total transmit power of a symbol for the SRS exceeds a user equipment (UE) maximum transmit power,
- wherein the SRS bandwidth is identified based on the grant, and
- wherein, when the SRS is received on the at least two component carriers, the transmit power of the SRS on each of the at least two component carriers is scaled based on following equation:

$$\sum_c w_c P_{SRS,c}(i) \leq P_{CMAX}$$

where $P_{CMAX}$ is the UE maximum transmit power, $w_c$ is the scaling factor, and $P_{SRS,c}$ is a transmit power of the SRS on a component carrier c of the at least two component carriers.

6. The method of claim 5, wherein the scaling factor is the same on the component carriers.

7. The method of claim 5, if the grant is an uplink grant, the SRS bandwidth is determined as a first bandwidth and if the grant is a downlink grant, the SRS bandwidth is determined as a second bandwidth.

8. The method of claim 5, wherein the SRS in a subframe on a component carrier is triggered based on at least one grant which is associated with same SRS parameters.

9. A terminal for a communication system, the terminal comprising:
- a transmitter; and
- processing circuitry configured to
  - identify a sounding reference signal (SRS) transmit power by power scaling based on a scaling factor if a total transmit power of a symbol for an SRS exceeds a user equipment (UE) maximum transmit power,
  - when the SRS is transmitted on at least two component carriers, scale each transmit power of the SRS on the at least two component carriers based on following equation:

$$\sum_c w_c P_{SRS,c}(i) \leq P_{CMAX}$$

where $P_{CMAX}$ is the UE maximum transmit power, $w_c$ is a scaling factor, and $P_{SRS,c}$ is a transmit power of the SRS on a component carrier c of the at least two component carriers,
  - identify an SRS bandwidth based on a grant which triggers the SRS, and
  - control the transmitter to transmit the SRS based on the identified SRS transmit power and SRS bandwidth.

10. The terminal of claim 9, wherein the scaling factor is the same on the component carriers.

11. The terminal of claim 9, wherein if the grant is an uplink grant, the SRS bandwidth is determined as a first bandwidth and if the grant is a downlink grant, the SRS bandwidth is determined as a second bandwidth.

12. The terminal of claim 9, wherein the SRS in a subframe on a component carrier is triggered based on at least one grant which is associated with same SRS parameters.

13. A base station of a communication system, the base station comprising:
- a transmitter;
- a receiver; and
- a controller configured to control the transmitter to transmit a grant which triggers a sounding reference signal (SRS) and to control the receiver to receive the SRS based on an SRS transmit power and an SRS bandwidth, and
- wherein the SRS transmit power is identified by power scaling based on a scaling factor if a total transmit power of a symbol for the SRS exceeds a user equipment (UE) maximum transmit power,
- wherein the SRS bandwidth is identified based on the grant, and
- wherein, when the SRS is received on the at least two component carriers, transmit power of the SRS on each of the at least two component carriers is scaled based on following equation:

$$\sum_c w_c P_{SRS,c}(i) \leq P_{CMAX}$$

where $P_{CMAX}$ is the UE maximum transmit power, $w_c$ is the scaling factor, and $P_{SRS,c}$ is a transmit power of the SRS on a component carrier c of the at least two component carriers.

14. The base station of claim 13, wherein the scaling factor is the same on the component carriers.

15. The base station of claim 13, if the grant is an uplink grant, the SRS bandwidth is determined as a first bandwidth and if the grant is a downlink grant, the SRS bandwidth is determined as a second bandwidth.

16. The base station of claim 13, wherein the SRS in a subframe on a component carrier is triggered based on at least one grant which is associated with same SRS parameters.

* * * * *